US 7,747,942 B2

United States Patent
Dasari et al.

(10) Patent No.: US 7,747,942 B2
(45) Date of Patent: Jun. 29, 2010

(54) SYSTEM AND METHOD FOR OBTAINING A MARKUP LANGUAGE TEMPLATE THROUGH REVERSING ENGINEERING

(75) Inventors: Srinivas Dasari, Scottsdale, AZ (US); Kevin Harvey, Phoenix, AZ (US); Cathy Sockrider, Peoria, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1225 days.

(21) Appl. No.: 11/311,622

(22) Filed: Dec. 20, 2005

(65) Prior Publication Data

US 2007/0143745 A1   Jun. 21, 2007

(51) Int. Cl.
*G06F 17/00* (2006.01)
(52) U.S. Cl. .................. 715/234; 715/200; 715/255
(58) Field of Classification Search .............. 715/234
See application file for complete search history.

(56) References Cited

U.S. PATENT DOCUMENTS

| | | | |
|---|---|---|---|
| 6,209,124 B1 * | 3/2001 | Vermeire et al. ............ 717/114 |
| 6,643,633 B2 * | 11/2003 | Chau et al. ...................... 707/1 |
| 6,687,873 B1 * | 2/2004 | Ballantyne et al. ........... 715/215 |
| 6,920,609 B1 * | 7/2005 | Manber et al. ............... 715/205 |
| 7,103,838 B1 * | 9/2006 | Krishnamurthy et al. .... 715/202 |
| 7,366,735 B2 * | 4/2008 | Chandrasekar et al. ... 707/104.1 |
| 2003/0069881 A1 * | 4/2003 | Huttunen ...................... 707/5 |
| 2004/0010753 A1 * | 1/2004 | Salter et al. ................. 715/513 |
| 2004/0028049 A1 * | 2/2004 | Wan ............................ 370/394 |
| 2004/0162813 A1 * | 8/2004 | Hollingsworth ................ 707/3 |
| 2004/0168124 A1 * | 8/2004 | Beisiegel et al. ............. 715/513 |
| 2004/0205707 A1 * | 10/2004 | Kothari et al. ............... 717/113 |
| 2004/0260676 A1 * | 12/2004 | Douglis et al. ................. 707/3 |
| 2005/0060647 A1 * | 3/2005 | Doan et al. ................... 715/514 |
| 2005/0144266 A1 * | 6/2005 | Antonelli et al. ............. 709/223 |
| 2005/0278358 A1 * | 12/2005 | Doughan .................... 707/100 |

* cited by examiner

*Primary Examiner*—Doug Hutton
*Assistant Examiner*—Zaida I Marrero
(74) *Attorney, Agent, or Firm*—Snell & Wilmer L.L.P.

(57) ABSTRACT

Process for reverse engineering a program application written in a legacy programming language (e.g., COBOL), where the program application was specifically designed using a markup language template so as to process documents in the markup language. The process involves extracting from the program application, line by line, content fragments of the original markup language template and reassembling them to obtain the original template.

20 Claims, 9 Drawing Sheets

```
0001 01 XML-DOCUMENT.
0002 05         PIC X(006)
0003            VALUE '<?xml '.                    ─── 230
0004 05         PIC X(014)
0005            VALUE 'version="1.0" '.
0006 05         PIC X(017)
0007            VALUE 'encoding="UTF-8" '.
0008 05         PIC X(002)
0009            VALUE '?>'.                        ─── 230
0010 05     GRP-BODY.
0011   10       PIC X(005)
0012            VALUE '<Body'.
0013   10       PIC X(001)
0014            VALUE '>'.
0015   10     GRP-RESULTS OCCURS 2.
0016     15     PIC X(008)
0017            VALUE '<Results'.
0018     15     PIC X(001)
0019            VALUE '>'.
0020     15   GRP-ACCTNBR.
0021       20   PIC X(008)
0022            VALUE '<Acctnbr'.
0023       20   PIC X(001)
0024            VALUE '>'.
0025       20 XML-ACCTNBR    PIC X(011)
0026            VALUE '00086791335'.
0027       20   PIC X(010)
0028            VALUE '</Acctnbr>'.
0029     15   GRP-ADDRDTLS OCCURS 3.
0030       20   PIC X(009)
0031            VALUE '<AddrDtls'.                 ─── 230
0032       20   PIC X(001)
0033            VALUE '>'.
0034       20 GRP-TYPE.
0035         25 PIC X(005)
0036            VALUE '<Type'.
0037         25 PIC X(001)
0038            VALUE '>'.
0039         25 XML-TYPE     PIC X(003)
0040            VALUE '001'.
0041         25 PIC X(007)
0042            VALUE '</Type>'.
0043       20 GRP-NAME.
0044         25 PIC X(005)
0045            VALUE '<Name'.
0046         25 PIC X(001)
0047            VALUE '>'.
0048         25 XML-NAME     PIC X(021)
0049            VALUE 'Testing XML retrieval'.
0050         25 PIC X(007)
0051            VALUE '</Name>'.
0052       20   PIC X(011)
0053            VALUE '</AddrDtls>'.
0054     15     PIC X(010)
0055            VALUE '</Results>'.
0056   10       PIC X(007)
0057            VALUE '</Body>'.
```

Fig. 2

| 310 | 320 | 330 | 340 | 350 | 360 |
|---|---|---|---|---|---|
| Line# | Source Line | Level N | Length L | New_xmlline | Other variables/Comments |
| 1 | 01  XML-DOCUMENT. | | | | |
| 2 | 05      PIC X(006) | 5 | 6 | | |
| 3 | VALUE '<?xml '. | | | <?xml | |
| 4 | 05      PIC X(014) | 5 | 14 | | |
| 5 | VALUE 'version="1.0" '. | | | <?xml version="1.0" | |
| 6 | 05      PIC X(017) | 5 | 17 | | |
| 7 | VALUE  'encoding="UTF-8" | | | <?xml version="1.0" encoding="UTF-8" | |
| 8 | 05      PIC X(002) | 5 | 2 | | |
| 9 | VALUE '?>'. | | | <?xml version="1.0" encoding="UTF-8" ?> | Write the output record |
| 10 | 05      GRP-BODY. | 5 | | | |
| 11 | 10      PIC X(005) | 10 | 5 | | |
| 12 | VALUE '<Body'. | | | <Body | |
| 13 | 10      PIC X(001) | 10 | 1 | <Body> | Write the output record |
| 14 | VALUE '>'. | | | | |
| 15 | 10      GRP-RESULTS OCCURS 2. | 10 | | | Occurs1_level = 10 Occurs1_size = 2 Label the output record .A1 |
| 16 | 15      PIC X(008) | 15 | 8 | | |
| 17 | VALUE '<Results'. | | | <Results | |
| 18 | 15      PIC X(001) | 15 | 1 | | |
| 19 | VALUE '>'. | | | <Results> | Write the output record |
| 20 | 15      GRP-ACCTNBR. | 15 | | | |
| 21 | 20      PIC X(008) | 20 | 8 | | |
| 22 | VALUE '<Acctnbr'. | | | <Acctnbr | |
| 23 | 20      PIC X(001) | 20 | 1 | | |
| 24 | VALUE '>'. | | | <Acctnbr> | |
| 25 | 20  XML-ACCTNBR  PIC X(011) | 20 | 11 | | |
| 26 | VALUE '00086791335'. | | | <Acctnbr>00086791335 | |
| 27 | 20      PIC X(010) | 20 | 10 | | |
| 28 | VALUE '</Acctnbr>'. | | | <Acctnbr>00086791335</Acctnbr> | Write the output record |

| 310 | 320 | | 330 | 340 | 350 | 360 |
|---|---|---|---|---|---|---|
| 29 | 3. | 15 GRP-ADDRDTLS OCCURS | 15 | | | Occurs2_level = 15<br>Occurs1_size = 3<br>Label the output record ..A2 |
| 30 | | 20   PIC X(009) | 20 | 9 | | |
| 31 | | VALUE '<AddrDtls'. | | | '<AddrDtls | |
| 32 | | 20   PIC X(001) | 20 | 1 | | |
| 33 | | VALUE '>'. | | | <AddrDtls> | Write the output record |
| 34 | | 20   GRP-TYPE. | 20 | | | |
| 35 | | 25   PIC X(005) | 25 | 5 | | |
| 36 | | VALUE '<Type'. | | | <Type> | |
| 37 | | 25   PIC X(001) | 25 | 1 | | |
| 38 | | VALUE '>'. | | | <Type> | |
| 39 | | 25 XML-TYPE   PIC X(003) | 25 | 3 | | |
| 40 | | VALUE '001'. | | | <Type>001 | |
| 41 | | 25   PIC X(007) | 25 | 7 | | |
| 42 | | VALUE '</Type>'. | | | <Type>001</Type> | Write the output record |
| 43 | | 20   GRP-NAME. | 20 | | | |
| 44 | | 25   PIC X(005) | 25 | 5 | | |
| 45 | | VALUE '<Name'. | | | <Name | |
| 46 | | 25   PIC X(001) | 25 | 1 | | |
| 47 | | VALUE '>'. | | | <Name> | |
| 48 | | 25 XML-NAME   PIC X(021) | 25 | 21 | | |
| 49 | | VALUE   'Testing XML retrieval'. | | | <Name>Testing XML retrieval | |
| 50 | | 25   PIC X(007) | 25 | 7 | | |
| 51 | | VALUE '</Name>'. | | | <Name>Testing XML retrieval</Name> | Write the output record |
| 52 | | 20   PIC X(011) | 20 | 11 | | |
| 53 | | VALUE '</AddrDtls>'. | | | </AddrDtls> | Write the output record |
| 54 | | 15   PIC X(010) | 15 | | | Repeat lines after ..A2<br>3 TIMES |
| 55 | | VALUE '</Results>'. | | | </Results> | Write the output record |
| 56 | | 10   PIC X(007) | 10 | 7 | | Repeat lines after ..A1<br>2 TIMES |
| 57 | | VALUE '</Body>'. | | | </Body> | Write the output record |

Fig. 3B

The output XML

```xml
<?xml version="1.0" encoding="UTF-8" ?>
<Body>
 <Results>
  <Acctnbr>00086791335</Acctnbr>
  <AddrDtls>
   <Type>001</Type>
   <Name>Testing XML retrieval</Name>
  </AddrDtls>
  <AddrDtls>
   <Type>001</Type>
   <Name>Testing XML retrieval</Name>
  </AddrDtls>
  <AddrDtls>
   <Type>001</Type>
   <Name>Testing XML retrieval</Name>
  </AddrDtls>
 </Results>
 <Results>
  <Acctnbr>00086791335</Acctnbr>
  <AddrDtls>
   <Type>001</Type>
   <Name>Testing XML retrieval</Name>
  </AddrDtls>
  <AddrDtls>
   <Type>001</Type>
   <Name>Testing XML retrieval</Name>
  </AddrDtls>
  <AddrDtls>
   <Type>001</Type>
   <Name>Testing XML retrieval</Name>
  </AddrDtls>
 </Results>
</Body>
```

Fig. 4

SYSTEM AND METHOD FOR OBTAINING A MARKUP LANGUAGE TEMPLATE THROUGH REVERSING ENGINEERING

BACKGROUND OF THE INVENTION

1. Field of the Invention

The present invention generally relates to a system, method, and computer program for reverse engineering a program application to obtain a markup language template that was used in generating the program application. More particularly, the present invention relates to reverse engineering a program application in a legacy programming language, where the program application was specifically designed using a markup language template to process documents in the markup language, in order to obtain a markup language template substantially identical to the one originally used to create that program application.

2. Related Art

Markup languages are commonly used in programming, particularly with newer programming formats and web based programming. There are several types of markup languages, including, but not limited to, HTML (Hypertext Markup Language), XML (Extensible Markup Language), XHTML (Extensible Hypertext Markup Language), etc. Generally, markup languages are programming languages in which the content of a document is marked with tags that provide information indicative of formatting, structure, font, content type, etc. More specifically, the markups (tags) are provided to the content of a document to indicate relevance or purpose of that content, or of portions thereof. Thus, when the document is read by a computing system designed to handle (i.e., process) the markup language, a program known as a parser can identify and extract the relevant content for which the type and/or purpose has been indicated by the tags. Thus, markup languages provide a simple and convenient way to represent data to be read and processed by a computer.

The examples provided herein will be discussed with respect to Extensible Markup Language (XML). One of ordinary skill in the relevant art will understand that the description of the invention also pertains to other markup languages.

While markup languages are gaining in popularity, many legacy program languages (e.g., COBOL, FORTRAN, BASIC, etc.) still used by programmers and institutions are not designed with built-in functionality for understanding markup language documents. These older programming systems could be replaced with object oriented program applications and/or web-based applications to solve the incompatibility between older legacy programs and modern markup language documents. However, older legacy programs still form a vital part of many programming systems, and the replacement of the same could be expensive and complicated. Consequently, these legacy program systems are likely to last into the foreseeable future.

These facts have led to the generation of program applications that run in legacy program environments and are specifically tailored to read markup language documents and convert the data contained therein to a form suitable for the legacy program language. Similar programs are available for generating markup language documents in legacy programming environments.

Programs for providing such functionality to legacy systems are described in, for example, U.S. patent application Ser. Nos. 10/906,020 and 10/906,018, both of which were filed on Jan. 31, 2005. Both of these applications are incorporated by reference herein.

Those applications describe systems for generating program applications in a legacy program environment, such as COBOL, in order to process a markup language document, such as an XML document. The methods for generating such program applications start with a markup language template which preferably includes all or most of the relevant markup language indicators (i.e., the tags which are used to identify content in a markup language document). Typically, the markup language template provides a description of all of the tags that the subsequently generated program application running on the legacy system can expect to encounter in processing documents in the markup language. The template operates as an example document which provides the necessary information to build a program application for processing future documents.

Preferably, using the template, a generation tool is used to create a copy book in the legacy language. A copy book is a file structure outside of the program which is copied into the program. Such copy books are understood by one of ordinary skill in the relevant art. The copy book is used to create an intermediate application programming interface (API). This interface is the program application which acts as a bridge between the markup language and the legacy program and, at run time, converts the tags of the markup events into a format which the legacy environment understands.

Ultimately, the program application written in the legacy language includes fragments of the original markup language template, which have been parsed out in order to create the necessary data structure of the program application. In essence, the parsing involves breaking down the hierarchy of the tags of the template into simple events, with the events being used to write the program application in the legacy environment.

With the necessary program application developed, the application can be implemented in the legacy system in order to allow the legacy system to read, process, and/or generate documents in the defined markup language. This gives the legacy system the ability to converse with more modern data formats and process documents it would otherwise not understand.

Once implemented, the program application can continue to provide the newfound functionality to the legacy system. There are, however, instances in which upgrades are necessary. In upgrading a system, it may be necessary to provide additional or alternative markup tags, which the original template did not address, or otherwise alter the data structure in the program application pertaining to the markup language. Such upgrades can be handled easily if the original template is available for modification. Problems arise, however, in that the original template is manually managed, and it is up to the developer to ensure that it is properly retained for later use. If the original template is not properly retained, the upgrading of the system can become complicated and time consuming.

Thus, what is needed is a system and method for reverse engineering a program application in the legacy environment to parse out and reconstruct the original template in the markup language, when the original template is not otherwise available.

BRIEF DESCRIPTION OF THE INVENTION

The present invention meets the above-identified needs by providing a system, method, and computer program product for obtaining an original markup template used to develop a program application by reversing engineering the program application.

The present invention is generally directed to reverse engineering a program application (used to read, process, and/or generate documents in a markup language) operating in a program environment in which the markup language could not otherwise be interpreted, in order to obtain a markup language template which was originally used to create the program application.

More specifically, the present invention is directed to a method, system, and computer program for searching a program application (operating in a program environment that could not otherwise interpret a mark up language document) for a markup language data structure, and reading the lines of the program application corresponding to the markup language data structure. In reading the lines of the program application, the invention extracts fragments of the original markup language template existing in the lines of the program application and reconstructs those fragments in accordance with associated code in the program application indicative of the relationship of those fragments to the template.

The process of the invention generally includes locating the beginning of the markup language data structure in a program application (which was designed using a markup language template) and processing program lines of the program application containing the markup language data structure. The processing preferably includes (i) extracting level information for each program line, (ii) extracting content fragments of a markup line of the markup language template to be obtained, (iii) detecting an end of the markup language line for which the content fragments have been extracted, (iv) writing out (for instance, to a file, document, or memory in which the mark-up language template is to be reconstructed, or into an intermediate area for creating the template) each markup language line once the end of the line has been detected, (v) extracting repetition information from the program line indicative of any markup language lines that are to be repeated, and, if applicable, (vi) repeating written-out markup language lines in accordance with extracted repetition information and extracted level information. Furthermore, the process involves reconstructing the markup language template by providing the written-out markup lines and repeated markup language lines in a template.

An advantage of the present invention is that it provides an alternative method to obtaining an original markup language template used to generate a program application in a legacy programming environment, when the original template is not otherwise available. Another advantage of the present invention is that it allows for easier generation of updated program applications by providing the original markup language template used to create such a program application, rather than having to recreate all of the programs in achieving the upgrade.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 2 is a sample XML data structure in a COBOL program application.

FIGS. 3A and 3B together are a chart setting forth the processing of the data structure shown in FIG. 2, in accordance with an embodiment of the present invention.

FIG. 4 is an output XML template that is achieved by the processing set forth in FIGS. 3A and 3B.

DETAILED DESCRIPTION

I. Overview

The present invention is directed to a system, method, and computer program product for reverse engineering a data structure in a program application to obtain a markup language template originally used to generate the program application. The present invention is now described in more detail in terms of the above exemplary reverse engineering process. This is for convenience only and is not intended to limit the application of the present invention. In fact, after reading the following description, it will be apparent to one skilled in the relevant art(s) how to implement the following invention in alternative embodiments.

II. System

Figure 1:
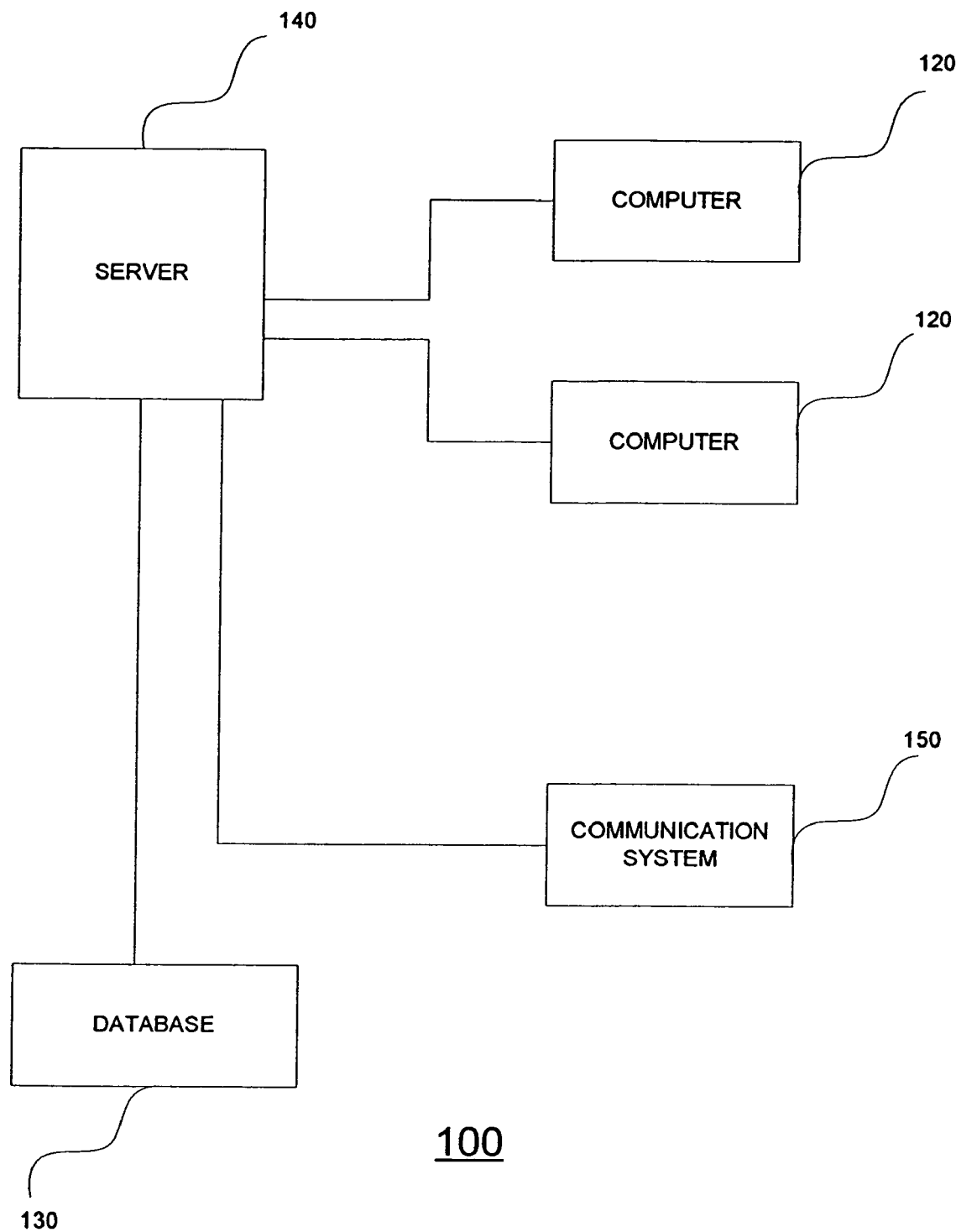
FIG. 1 is a system diagram of an exemplary computer system in which the present invention, in an embodiment, would be implemented.

Referring to FIG. 1, a system diagram of an exemplary computer system 100 in which the present invention, in an embodiment, would be implemented is shown.

System 100 includes computers 120, database 130, server 140, and communication system 150. Computers 120, database 130, and server 140 are interconnected to communicate in a local area network. Communication system 150 is connected to server 140 so as to provide communication with a larger network, such as the Internet.

A program application written in a legacy computer language (which is defined herein to include any programming language, such as COBOL, FORTRAN, BASIC, or any other, which does not have built in functionality for reading/processing a markup language, such as XML, HTML, XHTML, or the like) may be stored on one or more of server 140, database 130, computers 120, or other mediums, as will be discussed in more detail below in Section IV.

As discussed above, and set forth in detail in co-pending applications Nos. 10/906,020 and 10/906,018, the program application may be a program for reading, processing, and/or generating markup language documents. Thus, the program application is written in the legacy language in order to provided the functionality for understanding a markup language, which otherwise does not exist in the legacy language. FIG. 2 is an example of such a program.

In the example in FIG. 2, program 200 (in COBOL) consists of 57 lines of program code, which are numbered in column 210. Program 200 is actually an example of part of a program application, which includes the structure of a test XML (mark-up language) template. As discussed in the above-mentioned co-pending applications, the program application is generated from the markup language template, which is used in providing markup language tags which the program must be able to process during operation. An example of such a template is provided in FIG. 4, as will be discussed in more detail below.

The present invention is directed to reverse engineering the program application to obtain the original markup language template used to create the program application. Preferably, the process is achieved by a program product operating in one of the components of the computer system 100, such as computer 120 or server 140, the details of which are provide below in Section IV. Of course, any one of a number of systems may be used to implement the reverse engineering process of the present, as will be appreciated by one of ordinary skill in the relevant art(s).

III. Process

The process of the present invention is generally related to reverse engineering a program application. The program application is reverse engineered to obtain a markup language template used to generate the program application. Specifically, the program application is reverse engineered to extract fragments of the original language template used to create the program application, and reconstruct the fragments in the structure of the original template. The process generally includes a step of locating the start of a markup language data structure in the code of the program application, such as the XML data structure in FIG. 2.

Once the data structure is located, the code of the program application is read line by line to extract the necessary data. This may include extracting level information for each program line of the program application. The level information is used in tracking groups of data in the program application, particularly for groups of data to be repeated. Specifically, the markup language template may have repeated different lines of the language therein, or groups of lines. However, the program application, rather than repeating code, will simply indicate which information is being repeated, without specifically repeating the data. When constructing the markup language template from the program application, it is necessary to identify which lines or groups of lines of the markup language template are to be repeated. Tracking of the level information can be useful in this regard, as will be discussed in more detail later. In FIG. 2, reference numerals 220 indicate level information in the lines of code of a program application.

Initially various parameters/variables are defined, and storage areas for those variables are set to be blanks. The parameters are filled as the process proceeds. Those variables may include, among others, the markup/template line (this defines the storage area in which extracted fragments of content are stored and concatenated to build the markup line, until the line is completed and written out), level information, repeating information, etc., as will be discussed in more detail below.

The process extracts any content fragments in the successive lines of code. Content fragments (also referred to as "fragments", "content", etc.) are portions of the original markup language template that have been parsed in generating the program application. The content fragments of the original template are located, in the order of their appearance in the template, throughout the data structure of the program application. They exist as portions of the code of the program application used to give the functionality of processing other markup language documents.

Also, in preferred embodiments, the process may extract information indicative of the length of a content fragment. For instance, when a content fragment is extracted from the program application, there may be associated therewith information indicative of the length of that content, for example, the number of bytes. This length information refers to the length of bytes that the content fragment occupied in the original markup language template. This information is useful in that the length information can be compared with the actual length of the content fragment associated therewith. If the length of the actual content is longer than the information indicative of the original length, it indicates that the generation of the program application included adding to that content fragment bytes not originally included in the original markup language template.

For instance, in a markup language, an area for providing data can be represented by a single byte, when in fact the content may be expanded to include any number of characters. In various legacy program languages, such expandability does not exist, and the actual bytes provided represent the maximum number of bytes of content available for that variable, parameter, etc. Thus, in constructing the program application, an expandable unit from the markup language template may be given a length greater than that in the markup language template, to account for the expandability. By processing the length information and comparing it to the actual content fragment extracted, such instances can be detected and noted to a user when providing the reconstructed markup language template.

Another piece of information extracted from the lines of the program application is information indicative of the end of a markup language line (i.e., a line of code of the markup language template). Once the process has detected information indicative of the end of a markup line, the content fragments previously extracted and concatenated in one of the parameter areas is recognized as being a complete line, and is written out so that the next line can be stored in the parameter area. These steps are repeated to output consecutive lines of the markup language template.

In addition, the process extracts repetition information indicative of lines of markup language written out from the program application which are to be repeated in the markup language template. As discussed above, this is preferably done in connection with the level information written out for each program line of the program application. For instance, the program application may include data which indicates the start of a grouping of repeated information (i.e., data corresponding to lines of the template which were repeated), where the grouping ends, the number of times the grouping is to be repeated, and the position at which the repetition is to occur. As will be appreciated by one of ordinary skill in the relevant art, there are a number of ways of accomplishing this, depending on the particular legacy program language involved. Relevant examples of this process will be discussed below with respect to COBOL.

Finally, the process includes providing the written out markup language lines in a markup language template and repeating particular lines, or groups of lines, as indicated. This markup language document represents a copy of the original markup language template used in generating the program application.

One of ordinary skill in the relevant art will appreciate that the process may be modified depending on the preferences of the programmer and in accordance with the different legacy program languages in which the program application is written. Provided below are examples of the implementation of a process according to one embodiment of the present invention, where XML is the markup language and COBOL is the legacy language.

Figure 5A:
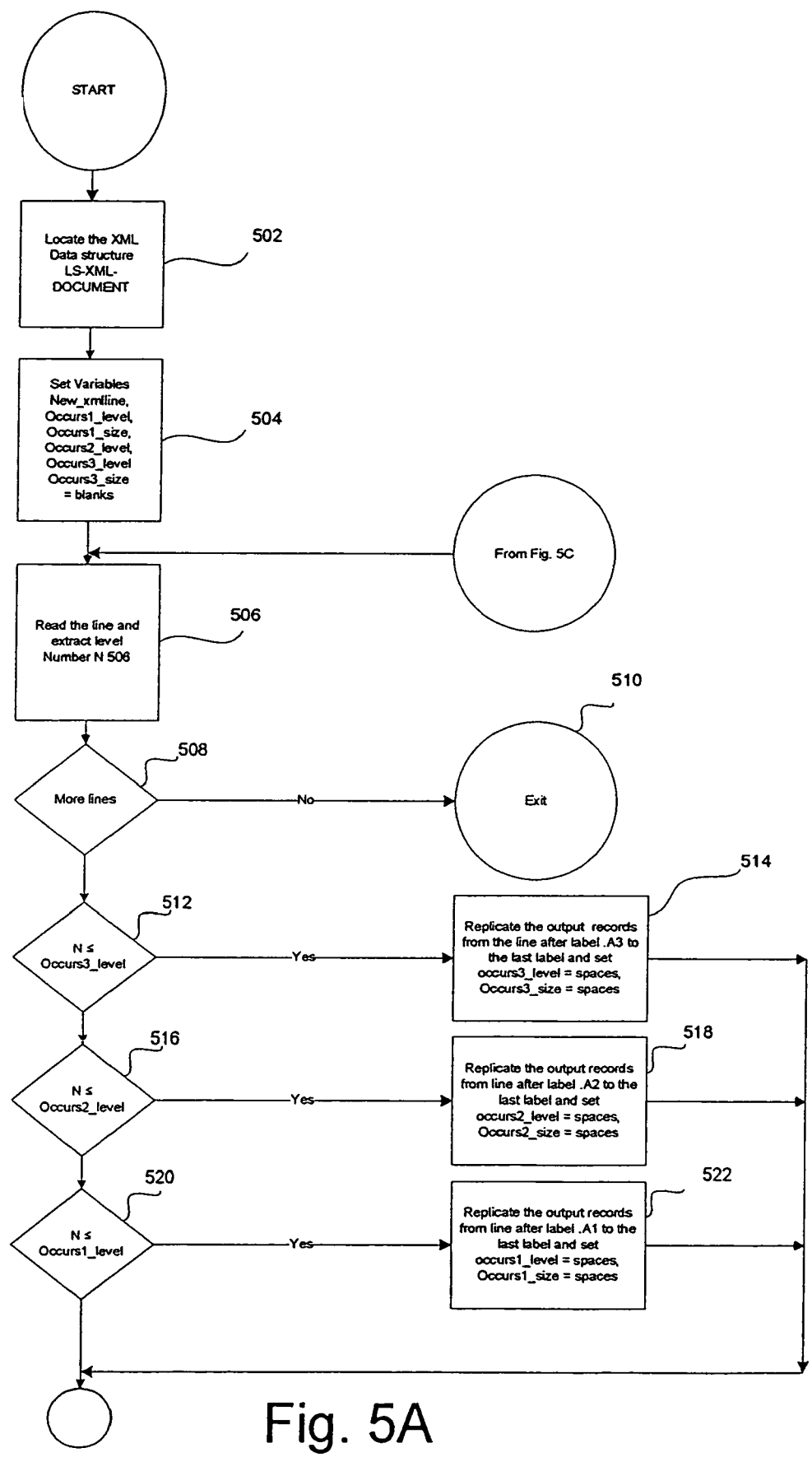
FIGS. 5A-5C are a flow chart illustrating a reverse engineering process according to one embodiment of the present invention.
Figure 5B:
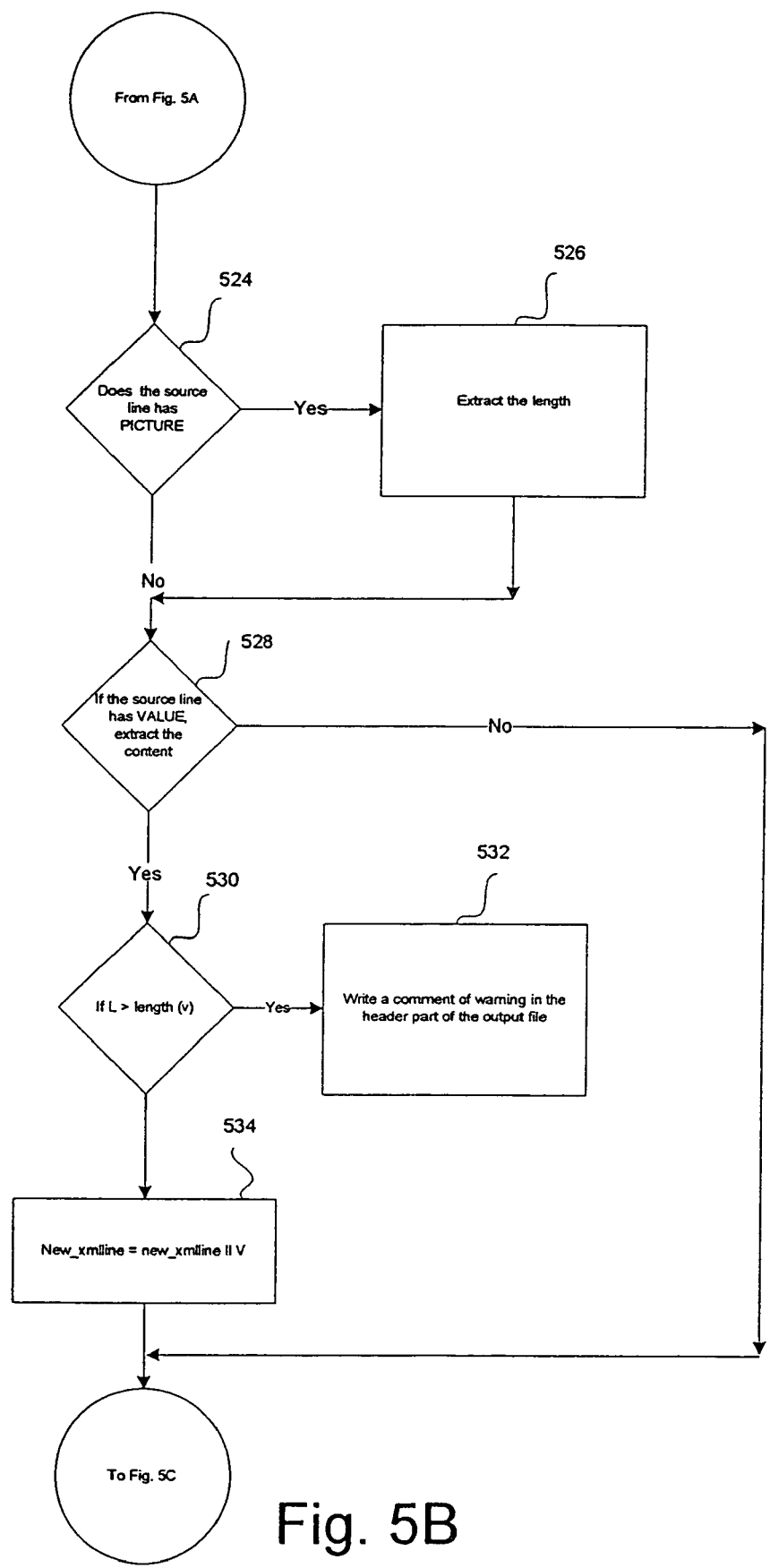
Figure 5C:
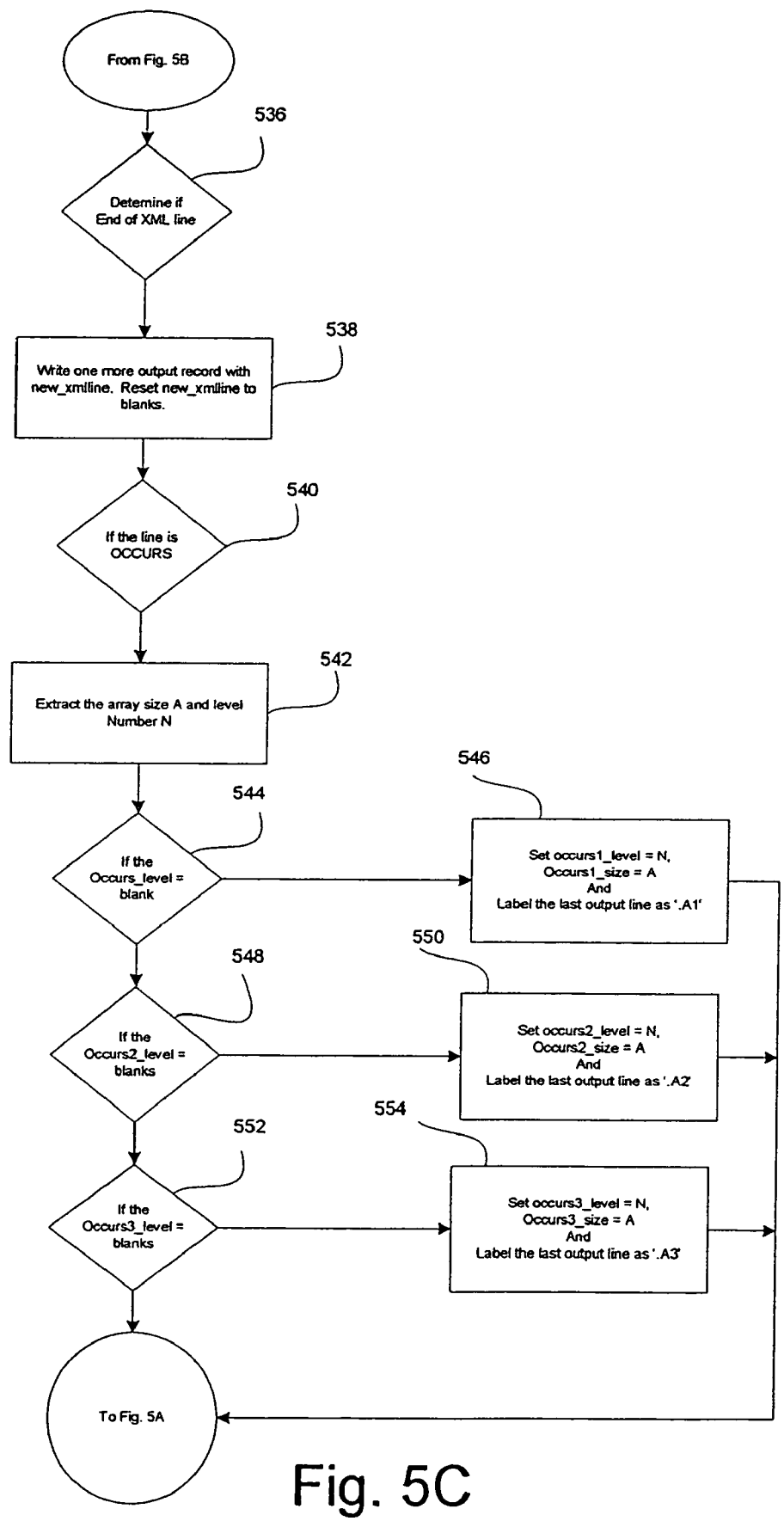
Figure 6:
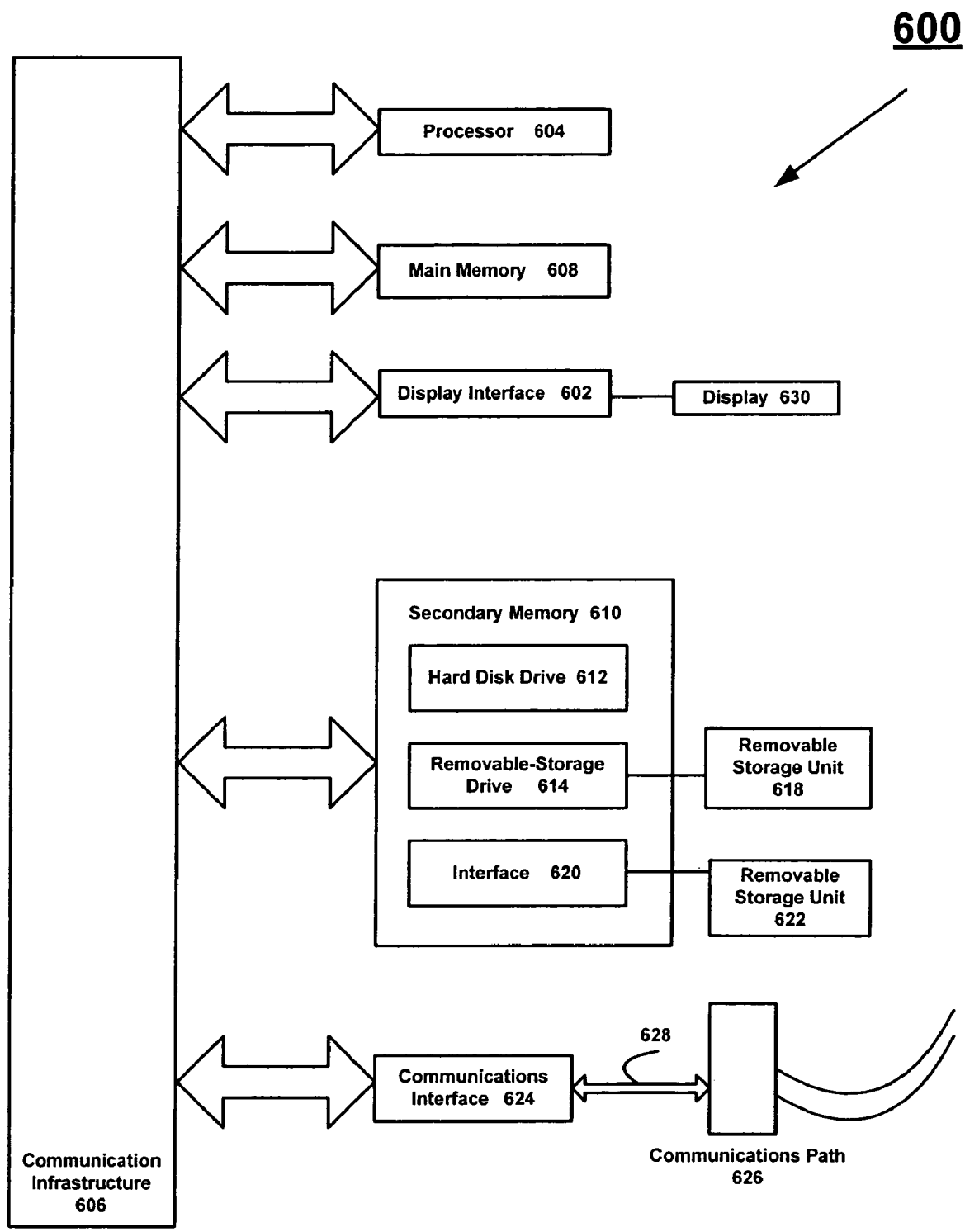
FIG. 6 is a system diagram of an exemplary computer in which the present invention, in an embodiment, would be implemented.

FIGS. 5A-5C illustrate a process in accordance with one embodiment of the present invention. Specifically, those figures depict the steps of a method in which a COBOL language program application is reversed engineered to obtain an XML template.

In step 502, the process locates an XML data structure which, in this embodiment, is entitled "LS-XML-document". In step 504, the process sets variables (parameters) to blank settings. The variables are parameters for which information is extracted from the COBOL program application and stored for use in the process. These parameters take the form of storage area memory. Examples of the variables are provided in step 504. The variable New_xmlline refers to the content fragments to be extracted from the COBOL program application. Specifically, the variable is set to dictate a storage area into which content fragments may be read, assembled with other fragments, and stored until the line of XML data is completed and written into a document to construct the template.

An "occurs" clause is relevant in COBOL language for indicating data to be repeated. The term "level" refers to the level information from the line of COBOL program application containing an occurs clause. The term "size" indicates the number of times the set of data is to be provided (i.e., repeated). As can be seen in step 504, there are variable areas for "occurs1", "occurs2", and "occurs3". These three different sets of occurs clauses are provided inasmuch as there may be multiple sets of data to be repeated. Thus, the different (and potentially nested) groups of data to be repeated can be separately identified. As would be appreciated by one of ordinary skill in the relevant art, more sets of occurs variables may be included, as needed.

Once all of the defined variables are set to blanks, the process proceeds to step 506. In step 506, a line of the COBOL program application is read, and the level number thereof is extracted. In step 508, it is determined whether there are more lines in the COBOL program application. If there are no more lines, the process is exited in step 510. If there are more lines, the process proceeds to step 512.

In step 512-522, the extracted level number is compared to the values in the occursx_level variables. This will only happen if the occurs variables have already been populated. (How those variables are populated will be discussed in detail below.) Specifically, in step 512 it is determined whether extracted level number N is less than or equal to a value stored in connection with the occurs3_level variable.

When the extracted level number is a level number (or less than the number) that is already populated in one of the variable areas (which will be discussed in detail below), the process understands that the line indicates the end of a set of data to be repeated. Thus, if level number N is less than or equal to occurs3_level (i.e., the occurs3_level variable is already populated with a number less than or equal to the level number of the current line), the process proceeds to step 514. In step 514, the process replicates the output records from the written out line beginning after a label ".A3" (discussed below) to the present line in accordance with the number of times indicated in the occurs3_size variable (the population of which is also discussed below). Also, the occurs3_level and occurs3_size variables are reset.

If the extracted level number N is not populated in the occurs3_level variable, or the extracted level N is not less than the value populated for that variable, the process proceeds to step 516. Similarly to steps 512 and 514, steps 516 and 518 make determinations for the extracted level N with respect to the occurs2_level variable. Furthermore, steps 520 and 522 provide similar functionality with respect to the occurs1_level variable. Once it is determined for each of the occurs variables whether the process should repeat a previous group of data (i.e., whether the current level number indicates the end of data to be repeated), the process proceeds to step 524 (FIG. 5B).

In step 524, it is determined if the line of COBOL program application code has a "picture" clause. If the line of code has a picture clause, the process proceeds to step 526, in which information regarding the length (L) is extracted. If there is no picture clause in the line, the process proceeds directly to step 528.

In step 528, it is determined whether the source line has a "value" clause. In the COBOL language, the value clause refers to content fragment. Reference numbers 230, in FIG. 3 indicates examples of content fragments. Consequently, at step 528, a content fragment (V) is extracted from the COBOL program application. If there is not a value clause, the process proceeds to step 536. If a value clause is extracted, the process proceeds to step 530, in which it is determined if L>length (V). In other words, it is determined if the extracted length information L is greater than the actual number of bytes of the extracted content fragment V. If the proposition holds true, the process proceeds to step 532, in which a comment warning of the discrepancy is written into the header of the output file. If the proposition does not hold true, the process proceeds to step 534. In step 534, the extracted content fragment V is added to the XML line being written, such that the variable new_xmlline is updated to be new_xmlline V. In other words, the extracted content is added to the XML line and concatenated with other fragments as necessary.

In step 536 (FIG. 5C), it is determined if the end of an xmlline being concatenated in accordance with variable new_xmlline has been reached. Specifically, if the first two bytes of a content fragment extracted in step 528 contains "<\" or the first character of the next value content starts with "<" or ">", the process identifies the end of a line. In step 538, if the end of a line has been identified, the data from new_xmlline is written out from the system using one or more output records. More than one output record may need to be written out depending on the size of the file. For instance, if the file length is too great, it may have to be written in multiple lines until all of the characters of the new_xmlline are written out. As an example, if the length of the output file is 120 bytes and the total data extracted/concatenated in the new_xmlline is 250 bytes, three lines are written—a first line of 120 bytes, a second line of 120 bytes, and a third line of 10 bytes. In addition, the variable new_xmlline is set to be blank once the completed line has been written out.

In step 540, it is determined if the content of the line has an occurs clause. If there is not an occurs clause, the process proceeds to the next step. If there is an occurs clause in the line, a repetition size A and a level number N are extracted from the line. In step 544, if the occurs1_level is still blank, the process proceeds to step 546, in which the occurs1_level variable is set to N and the occur1_size is set to A. In addition, the last output line is tagged with the label ".A1". If the occurs1_level is not blank, the process proceeds to step 548 in which it is determined whether the occurs2_level is blank. If it is blank, the process proceeds to step 550 which is similar to step 546 but that the occurs2 variables are set with level N and size A, and the last output line is labeled as ".A2". If the occurs2_level is not blank, the process proceeds to step 552. Steps 552 and 554 are similar to steps 544 and 546, except for that the occurs3_level is used and the last output line is labeled as ".A3". Thus, the start of data to be repeated is indicated, the repetition of which takes place once the end of data is located, as discussed above in steps 512-522.

The process then starts again at step 506, and repeats itself until it is determined at step 508 that there are no more lines of the COBOL program application corresponding to the XML data structure, in which case the process exits in step 510, with the complete XML template having been written out.

FIGS. 2-4 show an actual example of the processing described above. Specifically, FIG. 2 shows lines of code from a COBOL program application that were generated from an XML template. FIGS. 3A and 3B are a chart showing the functionality of the above-discussed method in extracting information from the COBOL program application shown in FIG. 2. FIG. 4 shows the resulting XML template output from the processing detailed in FIGS. 3A and 3B.

For instance, chart 300 is provided in FIGS. 3A and 3B. The line numbers for chart 300 (provided in column 310) correspond to the line numbers of program 200 (provided in column 210) of FIG. 2. As shown in line 2 of chart 300, the source line of the corresponding COBOL program application shown in FIG. 2 is a picture clause. Consequently, the level number N (see column 340) is extracted along with length L (see column 340). Line number 3 (see column 310) of the COBOL program application includes a value clause. Consequently, the value clause (in this case "<?xml" is extracted and stored in accordance with variable new_xmlline). In line number 9, the value clause includes ">". Consequently, the process detects the end of an XML (template) line, and the entire concatenated line is written out into the output record (see column 360). The line constructed from lines 2 through 9 of the COBOL program application can be seen in FIG. 4. Specifically, the first line of the output xml reads "<?xml version="1.0" encoding="UTF-8" ?>".

In line number 15 of the COBOL program language, the process encounters its first occurs clause. Specifically, that lines states "GRP-RESULTS OCCURS2." Because this is the first occurs clause of the application, the occurs variables have not previously been populated. Consequently, as shown in column 360, occurs1_level is set to 10, and occurs1_size is set to 2. As can be seen "10" is the level number N for that line, and the size 2 is determined from the occurs size recited in the COBOL code ("OCCURS2"). In addition, the process labels the last output record (line) with the label ".A1".

In line number 56, level number 10 is again recited. Because the variable occurs1_level has already been populated, with a number that is equal to or less than 10 (in this case 10, as shown in line 15 of chart 300), the process determines that repetition is to take place. Consequently, as indicated in column 360, all of the lines written out from the label A1 to line 56 are provided in the template two times. (Note, however, that this does not mean to repeat that information two additional times, but that the information is to be recited two times total, or in this case one additional time). The repetition can be seen in the output XML template in FIG. 4. Specifically, the lines from when the label A1 (line #15) was added to an output line, in line 15 of chart 300, to the occurrence of level number 10 in line 56, are indicated by reference numeral 410. In accordance with the information in line 56, section 410 is repeated, as shown by section 420.

After line 57, the process determines that there are no lines of the COBOL program application left which correspond to the data structure, in which case the process ends. Consequently, the XML template used to create the COBOL program application in FIG. 2 is completely written out, as shown in FIG. 4.

IV. Example Implementations

The present invention may be implemented using hardware, software or a combination thereof and may be implemented in one or more computer systems or other processing systems, as discussed in general above with respect to FIG. 1.

As a more specific example a computer system 600 for use in the present invention, such as computer 120 or server 140, includes one or more processors, such as processor 104. Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data for display.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer 620. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer 620.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 614, a hard disk installed in hard disk drive 612, and signals 628. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method of reversing engineering a program application for processing markup language documents, to reconstruct a markup language template used to generate the program application, comprising the steps of:

locating a start of a markup language data structure in code of the program application created using the markup language template;

reading program lines of the program application containing the markup language data structure;

extracting, from the program lines of the program application, (i) content fragments of markup language, and (ii) data indicating the end of a template line of the markup language template, comprised of extracted content fragments; and assembling the markup language template by (i) concatenating the extracted content fragments, in the order of their occurrence in the program lines, into template lines, and (ii) reading out the concatenated template lines in the markup language template in accordance with the extracted data indicating the end of each template line, wherein the markup language template contains (i) a plurality of indicators present in markup language documents which are processed by the program application, and (ii) correlations between the plurality of indicators and respective descriptions of the plurality of indicators; and wherein the locating, reading, extracting, and assembling steps are performed by a computer executing a computer program.

2. The method according to claim 1, further comprising the steps of extracting data indicating original byte sizes of the extracted content fragments and comparing the data indicating the extracted original byte sizes with the actual sizes of the extracted content fragments.

3. The method according to claim 2, further comprising the step of providing an alert to a user when the original byte size of a content fragment is less than the actual byte size of the extracted content fragment.

4. The method according to claim 3, wherein the alert is provided with the reconstructed markup language template.

5. The method according to claim 1, further comprising the steps of:

extracting from the program application start data indicating the start of a first portion of the data structure containing a first group of content fragments corresponding to lines of the markup language template which were repeated;

extracting end data indicating the end of the first portion of the data structure; and repeating in the reconstructed markup template all of the lines written out in connection with the first portion of the data structure.

6. The method according to claim 5, further comprising the steps of:

extracting from the program application start data indicating the start of a second portion of the data structure containing a second group of content fragments corresponding to lines of the markup language template which were repeated, wherein the first portion is contained within the second portion;

extracting end data indicating the end of the second portion of the data structure; and repeating in the reconstructed markup template all of the lines written out in connection with the second portion of the data structure.

7. The method according to claim 5, wherein the start data includes a level number of the line of the program application containing the start data and information indicating a number of times the first group of content fragments is to be repeated, and wherein the end data includes a first occurrence of the level number of the line of the program application containing the start data, after the line containing the start data.

8. The method according to claim 5, wherein the program application is written in COBOL.

9. The method according to claim 8, wherein the start data includes an occurs clause.

10. The method according to claim 1, wherein the program application converts data associated with the indicators within a markup language document into data for storage in said markup language data structure, according to the markup language template.

11. A computer program product comprising a computer usable medium having a physical data storage unit with control logic stored therein for causing a computer to reverse engineer a program application for processing markup language documents, to reconstruct a markup language template used to generate the program application, said control logic comprising:
  first computer readable program code means for causing a computer to locate a start of a markup language data structure in code of the program application created using the markup language template;
  second computer readable program code means for causing a computer to read program lines of the program application containing the markup language data structure;
  third computer readable program code means for causing a computer to extract, from the program lines of the program application, (i) content fragments of markup language, and (ii) data indicating the end of a template line of the markup language template, comprised of extracted content fragments; and
  fourth computer readable program code means for causing a computer to assemble the markup language template by (i) concatenating the extracted content fragments, in the order of their occurrence in the program lines, into template lines, and (ii) reading out the concatenated template lines in the markup language template in accordance with the extracted data indicating the end of each template line,
  wherein the markup language template contains (i) a plurality of indicators present in markup language documents which are processed by the program application, and (ii) correlations between the plurality of indicators and respective descriptions of the plurality of indicators.

12. The computer program product according to claim 11, further comprising:
  fifth computer readable program code means for causing a computer to extract data indicating original byte sizes of the extracted content fragments; and
  sixth computer readable program code means for causing a computer to compare the data indicating the extracted original byte sizes with the actual sizes of the extracted content fragments.

13. The computer program product according to claim 12, further comprising seventh computer readable program code means for causing a computer to provide an alert to a user when the original byte size of a content fragment is less than the actual byte size of the extracted content fragment.

14. The computer program product according to claim 13, wherein the alert is provided with the reconstructed markup language template.

15. The computer program product according to claim 11, further comprising:
  fifth computer readable program code means for causing a computer to extract from the program application start data indicating the start of a first portion of the data structure containing a first group of content fragments corresponding to lines of the markup language template which were repeated;
  sixth computer readable program code means for causing a computer to extract end data indicating the end of the first portion of the data structure; and
  seventh computer readable program code means for causing a computer to repeat in the reconstructed markup template all of the lines read out in connection with the first portion of the data structure.

16. The computer program product according to claim 15, further comprising the steps of:
  eighth computer readable program code means for causing a computer to extract from the program application start data indicating the start of a second portion of the data structure containing a second group of content fragments corresponding to lines of the markup language template which were repeated;
  ninth computer readable program code means for causing a computer to extract end data indicating the end of the second portion of the data structure; and
  tenth computer readable program code means for causing a computer to repeat in the reconstructed markup template all of the lines read out in connection with the second portion of the data structure,
  wherein the first portion is contained within the second portion.

17. The computer program product according to claim 15, wherein the start data includes a level number of the line of the program application containing the start data and information indicating a number of times the first group of content fragments is to be repeated, and
  wherein the end data includes a first occurrence of the level number of the line of the program application containing the start data, after the line containing the start data.

18. The computer program product according to claim 15, wherein the program application is written in COBOL.

19. The computer program product according to claim 18, wherein the start data includes an occurs clause.

20. A method of reverse engineering a program application for processing markup language documents, to reconstruct a markup language template used to generate the program application, comprising the steps of:
  locating the beginning of a markup language data structure in the program application created using the markup language template;
  processing each program line of the program application containing the markup language data structure, said processing step containing the sub-steps of:
  i) extracting level information for each program line;
  ii) extracting content fragments of markup lines of the markup language template to be reconstructed, which are embedded in the program lines;
  iii) detecting an end of each markup line for which content fragments have been extracted;
  iv) reading out the content fragments of each markup line after detection of the end of the markup line;
  v) extracting repetition information from the program lines indicative of markup lines to be repeated; and
  vi) repeating read-out markup lines in accordance with the extracted repetition information and the extracted level information; and
  constructing the markup language template by providing the read-out and repeated markup line,
  wherein the markup language template contains a plurality of indicators present in markup language documents which are processed by the program application, and, for each of the plurality of indicators, a correlation between the indicator and a description of the indicator; and
  wherein the locating and processing steps are performed by a computer executing a computer program.

* * * * *